United States Patent
Loehman et al.

(10) Patent No.: US 8,137,802 B1
(45) Date of Patent: Mar. 20, 2012

(54) MULTILAYER ULTRA-HIGH-TEMPERATURE CERAMIC COATINGS

(75) Inventors: Ronald E. Loehman, Albuquerque, NM (US); Erica L. Corral, Tucson, AZ (US)

(73) Assignee: Sandia Corporation, Albuquerque, NM (US)

( * ) Notice: Subject to any disclaimer, the term of this patent is extended or adjusted under 35 U.S.C. 154(b) by 556 days.

(21) Appl. No.: 12/366,028

(22) Filed: Feb. 5, 2009

(51) Int. Cl.
*B32B 9/00* (2006.01)

(52) U.S. Cl. ........ 428/325; 428/336; 428/408; 428/698; 428/704

(58) Field of Classification Search .................. 428/325, 428/336, 408, 698, 704
See application file for complete search history.

(56) References Cited

U.S. PATENT DOCUMENTS

| | | | | |
|---|---|---|---|---|
| 5,194,338 | A * | 3/1993 | Niebylski | 428/446 |
| 5,364,513 | A * | 11/1994 | Sekhar et al. | 501/120 |
| 5,678,809 | A * | 10/1997 | Nakagawa et al. | 267/148 |
| 5,895,716 | A * | 4/1999 | Fiala et al. | 428/408 |
| 6,255,234 | B1 * | 7/2001 | Erdemir et al. | 428/293.4 |
| 6,632,762 | B1 * | 10/2003 | Zaykoski et al. | 428/698 |

FOREIGN PATENT DOCUMENTS

EP 1367040 * 12/2003

OTHER PUBLICATIONS

He pp. 260-388 in "Oxidation Protection Systems for Carbon-Carbon Composites Formed by Chemical Vapor Deposition and Plasma Assisted Chemical Vapor Deposition Techniques" written by Shi et al reported on Jul. 24, 1992.*
Don et al pp. 45-56 in "Investigations of Oxidation Protection Systems for Carbon-Carbon Composites Formed by Chemical Vapor Deposition and Plasma Assisted Chemical Vapor Deposition Techniques" written by Don et al on Jan. 21, 1991.*
R.E. Loehman, et al, Development and Optimization of Thermal Protection Materials for Hypersonic Vehicles LDRD Final Report, SAND2009-6056, Sep. 2008,192 pages.

* cited by examiner

*Primary Examiner* — Archene Turner
(74) *Attorney, Agent, or Firm* — Elmer A. Klavetter; Kevin W. Bieg

(57) ABSTRACT

A coated carbon-carbon composite material with multiple ceramic layers to provide oxidation protection from ultra-high-temperatures, where if the carbon-carbon composite material is uninhibited with $B_4C$ particles, then the first layer on the composite material is selected from $ZrB_2$ and $HfB_2$, onto which is coated a layer of SiC coated and if the carbon-carbon composite material is inhibited with $B_4C$ particles, then protection can be achieved with a layer of SiC and a layer of either $ZrB_2$ and $HfB_2$ in any order.

12 Claims, 2 Drawing Sheets

MULTILAYER ULTRA-HIGH-TEMPERATURE CERAMIC COATINGS

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

BACKGROUND OF THE INVENTION

The present invention relates to multilayer ceramic coatings and more particularly, to multilayer, ultra-high-temperature ceramic coatings on a carbon-carbon composite material.

Ultra high temperature ceramics (UHTCs) are a class of materials with the potential to withstand extreme aerothermal heating environments. For example, diboride- and carbide-based ceramics possess melting temperatures in excess of 3000° C. Leading edges in aerodynamic environments can be exposed to ultra-high temperatures and thus materials are required that can perform in these environments. Carbon-carbon composite materials are potential materials that can be used provided that they can be coated such that oxidation of the surface can be sufficiently limited.

Oxidation protection is required for these materials for many applications. Previous work has indicated that no single coating material can be sufficiently protective.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
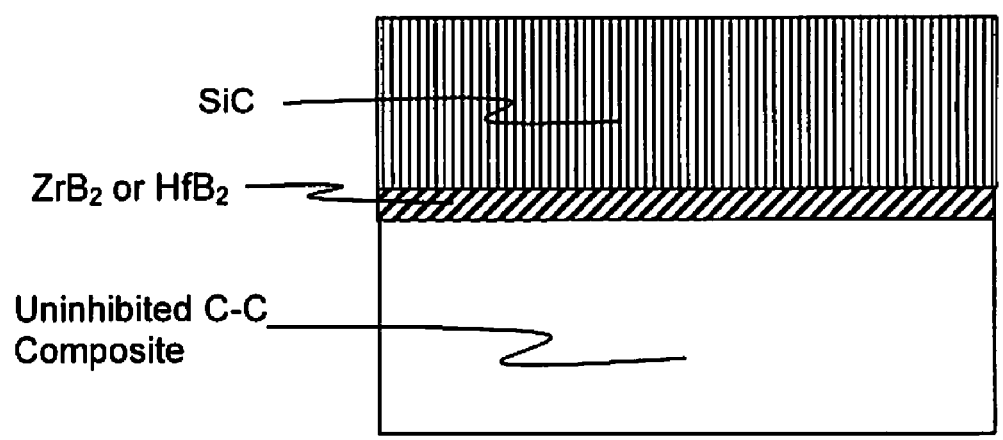
FIG. 1 is one embodiment of the present invention wherein a layer of $ZrB_2$ or $HfB_2$ is coated onto an uninhibited C—C composite material, with a SiC layer on top.

One embodiment of the present invention comprises a carbon-carbon (C—C) composite material coated with adherent, continuous multiple layers on an exposed surface to prevent oxidation. The coated C—C material comprises the C—C composite material with at least one layer of SiC and at least one layer of $ZrB_2$ or $HfB_2$. In one embodiment, the present invention comprises multilayer coatings on a C—C material with SiC as the top layer on the C—C composite material and $ZrB_2$ or $HfB_2$ as the bottom layer to provide oxidation protection of the C—C composite material, whether the C—C composite is inhibited with $B_4C$ or uninhibited. When inhibited, the volume percent of $B_4C$ particles is generally less than approximately 10 wt %, where the particles have sizes ranges from approximately 0.1 to approximately 20 microns. Numerous tests have shown that a single continuous coating of a C—C composite material with either SiC or $ZrB_2$ (or $HfB_2$) did not protect the C—C composite from oxidation. In the present invention, the protective coatings must be continuous (continuous meaning that there are no openings sufficiently large to allow oxygen to contact the unprotected carbon substrate and cause significant oxidation for the intended application conditions) and contain both SiC and $ZrB_2$ (or $HfB_2$), where if the C—C composite contains $B_4C$ (inhibited), the coating order is unimportant, and where if the C—C composite does not contain $B_4C$ (uninhibited), the $ZrB_2$ or $HfB_2$ layer must be the bottom coat. Multiple layers of SiC, $ZrB_2$ or $HfB_2$ can be applied as desired. For ease of discussion, many of the described embodiments herein will discuss only $ZrB_2$ but $ZrB_2$ and $HfB_2$ can be utilized, either separately on in combination in each embodiment.

The uninhibited C—C composites, with densities of between approximately 1.5 $g/cm^3$ and 1.6 $g/cm^3$, are sensitive to the order of ceramic coating. When the coating order is $ZrB_2$ or $HfB_2$ on top of the SiC layer that adheres to the C—C composite material, results show that the C—C composite oxidizes and is not protected. This multilayer coating fails because the $ZrB_2$ or $HfB_2$ top layer oxidizes to $ZrO_2$ (or $HfO_2$) and $B_2O_3$, in which the latter volatilizes at T>900° C. leaving behind $ZrO_2$ (or $HfO_2$). The SiC bottom layer begins to oxidize but remains mostly SiC between the layers of C—C sheets. When the coating order is reversed and the SiC is the top layer, the multi-layer coating is protective because the bottom layer of $ZrB_2$ or $HfB_2$ oxidizes to $B_2O_3$ which does not volatilize at T>900° C. because it is protected by the top coat of SiC. When SiC begins to oxidize to $SiO_2(s)$ and $CO(g)$, then the $B_2O_3$ flows like a viscous glass from beneath the SiC, limiting the oxidation effects. The inhibited C—C composites are not sensitive to the order of the multilayer ceramic coating because there is a source of boron present within the C—C composite that replenishes and promotes the formation of $B_2O_3$. Therefore, one embodiment of the present invention describes multilayer coatings that protect C—C composites from oxidation at 680 $Wcm^{-2}$ ($T_{max}$>2600° C.). The C—C composites that contain interlayer $B_4C$ (inhibited) show increased oxidation resistance, independent of multilayer coating order. The coatings of both $ZrB_2$ and $HfB_2$ and infiltrated slurries of SiC powder in liquid SiC precursor are required for best oxidation resistance. The layer of $ZrB_2$ or $HfB_2$ is approximately 0.1 to approximately 30 μm thick and the layer of SiC has a thickness of approximately 1 to 150 μm.

In one embodiment, the present invention is a multi-layered C—C composite material that has an uninhibited (that is, does not contain any intentionally added $B_4C$ particles) C—C material substrate coated on at least a portion of its surface with a continuous layer of a tetravalent transition metal boride compound, selected from the group consisting of $ZrB_2$ and $HfB_2$, onto which is coated another continuous layer of SiC (see FIG. 1).

Figure 2:
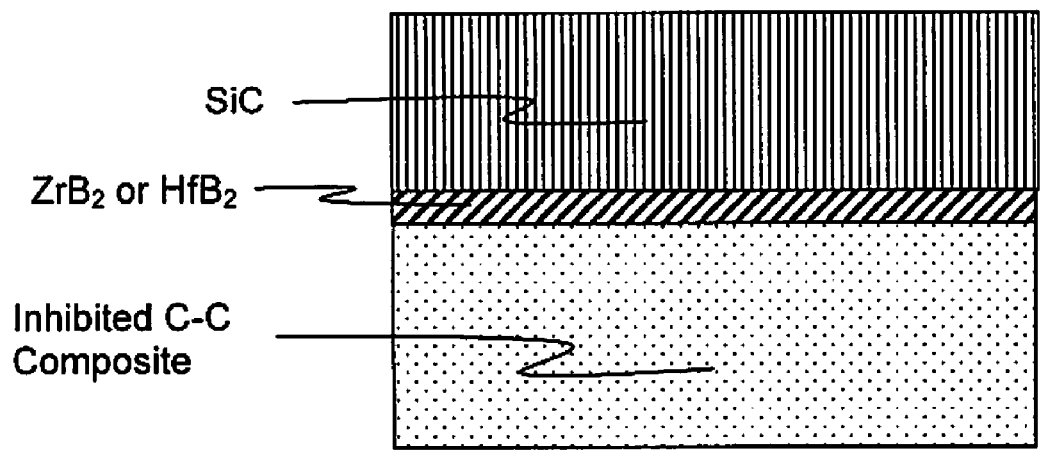
FIG. 2 is one embodiment of the present invention wherein a layer of $ZrB_2$ or $HfB_2$ is coated onto an inhibited C—C composite material, with a SiC layer on top.
Figure 3:
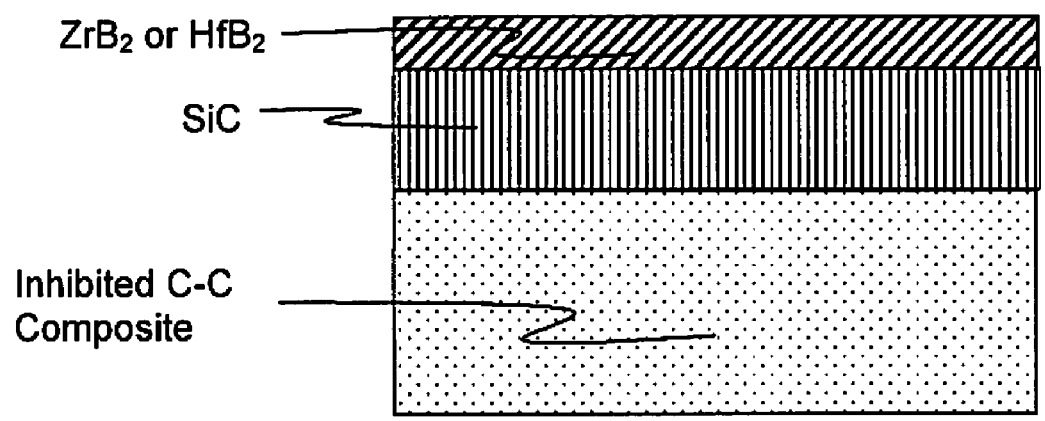
FIG. 3 is one embodiment of the present invention wherein a layer of SiC is coated onto an inhibited C—C composite material, with a $ZrB_2$ or $HfB_2$ layer on top.

In another embodiment, the present invention is a multi-layered C—C composite material that has an inhibited (that is, does contain a significant amount of $B_4C$ particles) C—C material substrate coated on at least a portion of its surface with a first continuous layer of a compound selected from SiC, $ZrB_2$ and $HfB_2$ onto which is coated another continuous layer of either $ZrB_2$ or $HfB_2$ if the first continuous layer is SiC or a continuous layer of SiC if the first continuous layer is $ZrB_2$ or $HfB_2$ (see FIGS. 2 and 3).

To adhere the layers, two coating methods were used: 1) preceramic polymer/ceramic slurry infiltration and 2) sputter coating deposition. The processing of preceramic polymers filled with crystalline ceramic particles was optimized for composition and pyrolysis heat treatment after each infiltration/coating cycle. The sputter coating process was also monitored for coating weight gain after each sputter deposition on a C—C composite. After both coating methods were optimized for a given C—C composition, they were used to produce UHTC multilayer coatings. The multilayer coatings were tested at high temperature and characterized in order to explain the different levels of oxidation protection that were achieved.

A number of precursors to SiC were evaluated as infiltrated coatings on C—C composites before selecting a commercially available precursor, SiC SMP-10, from StarFire Systems (Malta, N.Y.). SMP-10 is an allylhydridopolycarbosilane precursor compound to SiC that is readily available in large quantities and can be handled in an open-air environment. Precursors to $ZrB_2$ were also used and synthesized from information in the open literature as an alternate source of $ZrB_2$ coatings. Liquid precursors were applied through vacuum pressure-assisted dip-coating/infiltration followed by a pyrolysis heat treatment under flowing Ar (2° C./min. to 450° C., hold for 4 hours; 4° C./min to 1100° C., hold for 1 hour; 10° C./min to 100° C.; furnace cool). Ceramic slurries of SiC particles suspended in the liquid precursor to SiC were also used to build thicker and more continuous coatings. The allylhydridopolycarbosilane precursor compound was mixed with commercially available materials (such as a slurry mixture of 10 vol % SiC particles and 90 vol % allylhydridopolycarbosilane) as necessary to optimize the slurry/precursor viscosity for maximum infiltration into the C—C composites. Using particle filled precursor mixtures allows the back-filling of cracks and pores that result after coating with only preceramic polymers. When coating the surface of a C—C composite with only the allylhydridopolycarbosilane precursor compound, there exist large gaps between the crystallized SiC and large unprotected areas of C—C composite material even after several coatings and heat treatments. When coating using a mixture of approximately 20 (wt %) allylhydridopolycarbosilane and 80% of the mix of 10 vol % SiC particles and 90 vol % allylhydridopolycarbosilane, better coating coverage is attained, with approximately 97% of the surface of a C—C composite covered after only three infiltration/coating cycles using the SiC slurry/precursor mixture.

Using this 80% SiC slurry/20% precursor mixture, the percent weight gain was measured after each coating/heat treatment cycle for each C—C composite evaluated. The C—C composites that were both uninhibited and densified for only 50 hours measured the highest percent weight gain, >15 wt %. As expected, these low density, highly porous composites readily adsorbed the 80% SiC slurry/20% precursor mixture and produced highly infiltrated and continuous coatings. On average, the SiC coating thickness observed after three coatings was between 20-35 μm. The C—C composites that were both inhibited and densified for 150 hours measured the lowest percent weight gain, <5 wt %, after three dip coat cycles. These composites have higher densities and lower porosities than the rest of the C—C composites. They are also inhibited with $B_4C$ particles that block the porous channels from the surface of the material into the bulk. Images show that, after only one dip coat cycle, the $B_4C$ particles fill up the porous areas and allow only for small volumes of the coating to infiltrate throughout the composite. The C—C composites that measured an average weight percent gains all have similar density and porosity values and gained between 9 and 12 wt %. The composites densified for 150 hours pick up the least amount of material after the first dip coat cycle (4-5 wt %) and the composites that were densified for only 50 hours pick up slighter more coating after the first dip coat (7 wt %). Overall the weight percent gains for all the C—C composites are linear and show that the dip coat/ infiltration processing method utilized is capable of building continuous coatings on C—C composite structures.

A precursor to $ZrB_2$ was used to infiltrate and coat C—C composites, which gave weight gains after three dip coat cycles of less than 2.0%. In one embodiment, this coating was used as a bottom layer with the SiC coating on top. Images from SEM micrographs of a SiC/$ZrB_2$-precursor on an inhibited, 150 hr densified, heat treated C—C composite show the covered area fraction of C—C composite to be greater than 99%. The micrographs suggest that this coating is inhomogeneous and that the precursor to $ZrB_2$ and SiC are coating preferential areas of the C—C composite. This observation further illustrates the complexity of reproducibly making uniform coatings using a liquid preceramic polymer.

The potential for using a vapor deposition process to build thin film multilayer coatings was investigated using magnetron sputter deposition. This technique can provide uniform (99.5%) coatings on specimen diameters of 8", the process is automated and it is capable of depositing uniformly onto complex-shaped substrates such as tubes and fibers, and can automatically control deposited thicknesses to less than 1 μm. However, UHTC sputter targets are not commercially available. Therefore, a target had to be processed and manufactured in the desired UHTC composition, 80 vol % $ZrB_2$-20 vol % SiC. The UHTC composite powders were attritor milled and then processed in a high-temperature hot press furnace. The powders were attritor milled for 4 hours in methanol, dried and ball billed for 24 hours prior to hot pressing. During hot pressing, the maximum temperature reached was 1800° C. for less than 2 hours with an applied pressure of 5000 psi. The final dimensions of the target were achieved by diamond machining to approximately, ¼" thick and 3" diameter. Following hot-pressing and grinding the target was brazed (Cu—Ag—Ti) onto a Cu substrate.

The percent weight gain of multilayer coatings comprising bottom layers of sputter coated $ZrB_2$ and top layers of SiC, on each C—C composite composition were evaluated. The specimens gain weight after each coating cycle, reached between 3 and 19 wt % after four coating cycles. After the first sputter deposition, the C—C composites gained between 0.02 and 0.05 wt %. The desired thickness of each sputter deposited coating was intentionally selected to be very small, only 0.75 μm. When applying multilayer coatings of SiC/$ZrB_2$ on an uninhibited, 50 hr densified, without heat treatment C—C composite, the average thickness of the $ZrB_2$ coating was approximately 2 μm. From imaging and spectroscopic analysis, it is clear that using the sputter coating and dip coat/ infiltration method allows for reproducible, thick, continuous and adherent multilayer coatings. The sputtered coatings are continuous and conformal to individual C—C composite fibers. Sputtered $ZrB_2$ coatings on top of SiC are continuous as long as the SiC coating is continuous. The $ZrB_2$/SiC coating on C—C composites contain more SiC at the surface and are more filled throughout the bulk of the composite.

Characterization of C—C composites has shown that how they are processed strongly influences the microstructure and surface characteristics of the carbon fibers. Specifically, high temperature heat treatment decreases the open porosity due to amorphous carbon deposition at the surface of the material, as well as creating microstructures with better crystallinity, and an increase of the size and orientation of the crystallites of the fiber and matrix. This pre-treatment enhances the absorbance of ceramic coatings by controlling the physical and chemical properties that affect coating infiltration and adhesion.

Three general processing treatments were utilized for the C—C composite materials. One treatment, a post processing heat treatment, was performed at 1600° C. for 4 hours under vacuum to control coating adhesion properties. Adhesion to the carbon fibers is controlled by chemical bonding due to surface functional groups and by mechanical interlocking due to physical surface morphology. The heat treatment cleans the fiber surfaces by de-functionalizing the C fibers and crystallizing any residual amorphous carbon. This creates a uniform carbon surface composition and achieves a higher degree of graphitization that can allow better wetting and penetration of the coating. The heat treatment also affects the pore structure between the fibers and provides larger channels for UHTC precursor infiltration into the substrate.

In a second processing treatment, a chemical vapor infiltration (CVI) process with times of 150 and 50 hrs was used to modify final densities of the C—C composites through internal deposition of graphitic carbon. The standard high-density CVI process is 150 hours, whereas the low-density composites are infiltrated for 50 hours. The low-density composites have surfaces with a uniform porous structure that allows more infiltration of the coating.

In a third processing treatment, the C—C composite materials were inhibited with $B_4C$, which increases the oxidation resistance of graphite. Some of the C—C composites were filled with $B_4C$ particles when they were processed into the composite plates, hereinafter referred to as "inhibited." The presence of $B_4C$ inside the C—C weave also serves as a reservoir for boron that favorably interacts at high temperatures with the applied ceramic coatings. The boron facilitates the formation of a viscous glassy borate coating on the carbon fibers that provides more oxidation protection than the diborides alone.

The C—C composites were analyzed using scanning electron microscopy (SEM), mercury infiltration porosimetry (MIP) and X-Ray photoelectron spectroscopy (XPS) in order to characterize their physical and chemical properties that result from composite processing and pre-treatments. The cross sections reveal discontinuous internal porosity from the surface to the bulk for material densified using chemical vapor deposition (CVD) for only 50 hours. The materials densified for 50 and 150 hours have final void percentages greater than 19% and less than 17%, respectively. Cross-sections for material densified for longer periods of time show the porosity does not form continuous paths from the surface through to the bulk. As expected, porosity could be controlled by modifying densification exposure time using CVD.

The C—C composite pore size and distribution were further characterized using MIP. Results show that heat treatment does not change the pore size distribution for C—C composites that have been densified for only 50 hours but does changes the pore size distributions when they have been densified for 150 hours. As expected, densified materials using the standard CVD cycle time (150 hrs) have more amorphous carbon deposited and are more susceptible to graphitization during the post-processing heat treatment. The heat treatment graphitizes (crystallizes) the amorphous carbon, resulting in a more ordered crystallite structure and a change to the porous structure. After heat-treating uninhibited C—C composites, the pore size is reduced and there is an increase in the volume of larger pores (~120 µm). After heat-treating inhibited C—C composites, the pore size distribution is relatively the same but the volume average size of smaller pores increases from 100 to 1000 µm. The effect of densification time on heat-treated, inhibited and uninhibited C—C composites shows that there is a larger pore size and pore volume for shorter densification times. The effect of inhibition on C—C composites densified for the same amount of time and same heat treatment shows that there is an increased volume of larger pores in the uninhibited material. This is likely due to the presence of $B_4C$ particles used to inhibit the material and is also for shorter densification times of only 50 hrs. The composites densified for 150 hours have a more refined pore size distribution than those exposed to only a 50 hour CVD densification cycle.

The effect of heat treatment on the surface chemistry of the C—C composites was also analyzed using XPS. Evaluation of the chemical spectra for C—C composites that are uninhibited, then densified using the standard CVD cycle both with or without heat treatment shows that the C 1s peak is narrower after heat treatment. The results also suggest that, whereas not all bulk structural defects are removed with heat treatment, the surface functional groups are removed.

Multilayer ceramic-coated C—C composite materials were processed and tested at a solar furnace. The two solar testing conditions used reached maximum heat fluxes of 350 and 680 W cm$^{-2}$ for 38 and 15 seconds, corresponding to maximum specimen surface temperatures above 2000° C. and 2600° C., respectively. The results show that the inhibited C—C composites coated with SiC/ZrB$_2$ and ZrB$_2$/SiC both survive the extreme thermal heating and were protected from oxidation. The uninhibited C—C composites coated with SiC/ZrB$_2$ (top/bottom) coatings are also protective but when the reverse order is applied to the uninhibited C—C composite the coating fails to protect the composite. That is to say, the inhibited C—C composites are not sensitive to the order of the multilayer ceramic coating, whereas the uninhibited C—C composites survive when the interfacial layer (bottom layer) is ZrB$_2$. The results clearly show that multilayer coatings with SiC as the top layer and ZrB$_2$ as the bottom layer provide for oxidation protection of C—C, whether the composite is inhibited with B$_4$C or uninhibited. Numerous tests showed that single continuous coating of SiC or ZrB$_2$ did not protect C—C from oxidation. Thus, the results from these experiments show that protective coatings must be continuous and contain both SiC and ZrB$_2$ (or HfB$_2$), that if the C—C contains B$_4$C (inhibited) the coating order is unimportant, and that if the C—C does not contain B$_4$C (uninhibited) the ZrB$_2$ (or HfB$_2$) must be the bottom coat.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

We claim:

1. A coated carbon-carbon composite material, comprising:
   an inhibited carbon-carbon material comprising B$_4$C particles;
   a first continuous layer comprising at least one material chosen from ZrB$_2$ and HfB$_2$ coated onto at least a portion of a surface of said carbon-carbon material; and
   a second continuous layer comprising SiC coated onto said first continuous layer.

2. The coated carbon-carbon composite material of claim 1 comprising less than 10 volume weight % of B$_4$C particles.

3. The coated carbon-carbon composite material of claim 1 wherein said uninhibited carbon-carbon composite material had a density of between approximately 1.5 g/cm$^3$ and 1.6 g/cm$^3$.

4. The coated carbon-carbon composite material of claim 1 wherein said $B_4C$ particles have sizes ranging from approximately 0.1 μm to approximately 20 μm.

5. The coated carbon-carbon composite material of claim 1 where said first continuous layer has a thickness between approximately 0.1 μm and approximately 30 μm.

6. The coated carbon-carbon composite material of claim 1 where said second continuous layer has a thickness between approximately 1 μm and approximately 150 μm.

7. A coated carbon-carbon composite material, comprising:
- an inhibited carbon-carbon material comprising $B_4C$ particles;
- a first continuous layer comprising SiC coated onto at least a portion of a surface of said carbon-carbon material; and
- a second continuous layer comprising at least one material chosen from $ZrB_2$ and $HfB_2$ coated onto said first continuous layer.

8. The coated carbon-carbon composite material of claim 7 comprising less than 10 volume weight % of $B_4C$ particles.

9. The coated carbon-carbon composite material of claim 7 wherein said uninhibited carbon-carbon composite material had a density of between approximately 1.5 $g/cm^3$ and 1.6 $g/cm^3$.

10. The coated carbon-carbon composite material of claim 7 wherein said $B_4C$ particles have sizes ranging from approximately 0.1 μm to approximately 20 μm.

11. The coated carbon-carbon composite material of claim 7 where said first continuous layer has a thickness between approximately 1 μm and approximately 150 μm.

12. The coated carbon-carbon composite material of claim 7 where said second continuous layer has a thickness between approximately 0.1 μm and approximately 30 μm.

\* \* \* \* \*